United States Patent
Shibata et al.

(10) Patent No.: US 12,378,381 B2
(45) Date of Patent: Aug. 5, 2025

(54) POROUS CELLULOSE AND METHOD FOR PRODUCING SAME

(71) Applicant: Daicel Corporation, Osaka (JP)

(72) Inventors: Toru Shibata, Tokyo (JP); Hiromichi Okura, Tokyo (JP); Yuki Hirabayashi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 802 days.

(21) Appl. No.: 17/631,504

(22) PCT Filed: Jul. 30, 2020

(86) PCT No.: PCT/JP2020/029220
§ 371 (c)(1),
(2) Date: Jan. 31, 2022

(87) PCT Pub. No.: WO2021/020507
PCT Pub. Date: Feb. 4, 2021

(65) Prior Publication Data
US 2022/0275162 A1    Sep. 1, 2022

(30) Foreign Application Priority Data
Aug. 1, 2019 (JP) .................. 2019-142164

(51) Int. Cl.
C08J 9/00 (2006.01)
C08J 9/28 (2006.01)

(52) U.S. Cl.
CPC ............. *C08J 9/28* (2013.01); *C08J 2301/02* (2013.01); *C08J 2401/04* (2013.01)

(58) Field of Classification Search
None
See application file for complete search history.

(56) References Cited

U.S. PATENT DOCUMENTS

| 2003/0012941 A1 | 1/2003 | Fujita et al. |
| 2003/0186041 A1 | 10/2003 | Fujita et al. |
| 2008/0070027 A1 | 3/2008 | Fujita et al. |
| 2016/0243521 A1* | 8/2016 | Hayashi ................. B01J 20/286 |
| 2016/0244483 A1 | 8/2016 | Okubo et al. |
| 2019/0256555 A1 | 8/2019 | Okubo et al. |

FOREIGN PATENT DOCUMENTS

| JP | 2-235944 A | 9/1990 |
| JP | 4-91142 A | 3/1992 |
| JP | 9-132601 A | 5/1997 |
| JP | 11-158202 A | 6/1999 |
| JP | 2013-133355 A | 7/2013 |
| WO | 2005/073286 A1 | 8/2005 |

OTHER PUBLICATIONS

JP-09132601-A-English translation (Year: 1997).*
International Search Report issued Sep. 29, 2020, in corresponding International Application No. PCT/JP2020/029220, 2pp.
Written Opinion of the International Search Authority issued Sep. 29, 2020, in corresponding International Application No. PCT/JP2020/029220, 4pp.
Extended European Search Report issued Jul. 14, 2023, in corresponding European Patent Application No. 20845934.7, 8pp.
Li N et al: "Copper adsorption on chitosan-cellulose hydrogel beads: behaviors and mechanisms", Separation and Purification Technology, Elsevier Science, Amsterdam, NL, vol. 42, No. 3, Apr. 1, 2005 (Apr. 1, 2005), pp. 237-247, XP027702313.
Yang Jiayi et al: "Spherical nanocomposite particles prepared from mixed cellulose-chitosan solutions", Cellulose, Springer Netherlands, Netherlands, vol. 23, No. 5, Aug. 5, 2016 (Aug. 5, 2016), pp. 3105-3115, XP036047574.
Kadokawa J I et al: "Preparation of cellulose-starch composite gel and fibrous material from a mixture of the polysaccharides in ionic liquid", Carbohydrate Polymers, Applied Science Publishers , Ltd Barking, GB, vol. 75, No. 1, Jan. 5, 2009 (Jan. 5, 2009), pp. 180-183, XP025431369.
International Search Report and Written Opinion mailed on Sep. 29, 2020, received for PCT Application PCT/JP2020/029220, Filed on Jul. 30, 2020, 9 pages including English Translation.

* cited by examiner

*Primary Examiner* — Stefanie J Cohen
(74) *Attorney, Agent, or Firm* — XSENSUS LLP

(57) ABSTRACT

Provided is novel porous cellulose having functionality that is not imparted to porous cellulose composed of unsubstituted cellulose, and a method for producing the same. Porous cellulose containing: unsubstituted cellulose; and a glucose unit-containing polymer excluding unsubstituted cellulose, wherein a content of the polymer is not more than 20 mass % in 100 mass % of a total of the polymer and the unsubstituted cellulose.

7 Claims, No Drawings

POROUS CELLULOSE AND METHOD FOR PRODUCING SAME

CROSS-REFERENCE TO RELATED APPLICATIONS

The present application is based on PCT filing PCT/JP2020/029220, filed Jul. 30, 2020, which claims priority to Japanese Patent Applications No. 2019-142164, filed on Aug. 1, 2019, the entire contents of each are incorporated herein by reference.

TECHNICAL FIELD

The present disclosure relates to porous cellulose and a method for producing the same.

BACKGROUND ART

Polysaccharides represented by cellulose, and derivatives thereof are used in a variety of applications. For example, these microporous materials themselves can serve as adsorbents, and when the surface of these microporous materials is subjected to some sort of chemical modification, functions such as adsorption, separation, and catalytic functions can be imparted.

For example, various methods for producing a matrix for separating biopolymers, the matrix using cellulose, agarose, and the like, have been disclosed, and usefulness thereof is well known. In order to impart functionality to the surface of cellulose or other polysaccharides, chemical modification is performed. For example, when an —OH group of sugar is reacted with chloroacetic acid under a basic condition, carboxymethyl ether is produced, and when an —OH group of sugar is reacted with 1-chloro-2-(diethylamino)ethane under a basic condition, diethylaminoethyl ether is produced, and each of the products is utilized as a weak ion exchanger. However, such chemical modification not only increases the cost, but also may adversely affect micro to macro structures of particles. Therefore, a more convenient method for introducing functional groups is desired.

On the other hand, as a method for producing cellulose beads, for example, Patent Document 1 discloses a method including dissolving cellulose in an alkali hydroxide aqueous solution containing urea or thiourea, and spraying the solution to be brought into contact with a coagulation liquid. In addition, for example, Patent Document 2 discloses a method including dispersing, in an organic liquid, cellulose in an alkali hydroxide solution in a micro dispersion state, and contacting the cellulose slurry with a coagulation solvent. These are excellent methods for obtaining cellulose beads with fine pores in a simple process, but there are problems described above for performing the chemical modification.

CITATION LIST

Patent Document

Patent Document 1: JP 2013-133355 A
Patent Document 2: WO 2015/046473

SUMMARY OF INVENTION

Technical Problem

A main object of the present disclosure is to provide novel porous cellulose having functionality that is not imparted to porous cellulose composed of unsubstituted cellulose itself, and a method for producing the same.

Solution to Problem

The inventors of the present disclosure have conducted diligent research to solve the problems described above. As a result, the inventors have found that by adopting, as a method for producing porous cellulose, a method for producing porous cellulose, the method including: preparing a mixed solution containing unsubstituted cellulose and a glucose unit-containing polymer excluding unsubstituted cellulose, and bringing the mixed solution into contact with a coagulation solvent, and setting a content of the polymer to not more than 20 mass % with respect to 100 mass % of a total of the polymer and the unsubstituted cellulose in the mixed solution, novel porous cellulose having functionality that is not imparted to the porous cellulose composed of the unsubstituted cellulose itself is obtained. The present disclosure was achieved through further examinations based on these findings.

Item 1. Porous cellulose containing:
unsubstituted cellulose; and a glucose unit-containing polymer excluding unsubstituted cellulose,
in which a content of the polymer is not more than 20 mass % in 100 mass % of a total of the polymer and the unsubstituted cellulose.

Item 2. The porous cellulose according to Item 1, wherein a solid content of the porous cellulose in a hydrated state is not greater than 10 mass %, the solid content being measured by a solid content measurement method
and the method includes performing operation of:
allowing the porous cellulose that has settled in pure water to stand under atmospheric pressure in an environment at a temperature of 25° C. for one day or more; then, drawing approximately 2 mL of the porous cellulose in the pure water with a pipette, dispersing the drawn fraction in 20 ml of a solution of neutral detergent diluted 1000 times with pure water, and allowing the solution to stand for one day or more to precipitate the porous cellulose; then, removing a supernatant by decanting, placing approximately ⅓ of remaining slurry, which serves as one measurement sample, onto filter paper corresponding to No. 3 type specified in JIS P 3801 [Filter paper (for chemical analysis)], leaving the slurry to stand for 20 seconds to remove excessive moisture, separating a lump of the porous cellulose remaining on the filter paper from the filter paper, and weighing the lump, the weight being defined as a wet mass of the porous cellulose; and then, drying the porous cellulose in an oven at 80° C. for 2 hours, and weighing the porous cellulose, the weight being defined as a dry mass, and performing the operation on three measurement samples, calculating a respective proportion of dry mass to the wet mass, and determining an average value of three values, the average value being defined as a solid content.

Item 3. The porous cellulose according to Item 1 or 2, wherein the polymer is a cellulose derivative.

Item 4. The porous cellulose according to Item 3, wherein the cellulose derivative is at least one selected from the group consisting of carboxymethyl cellulose, carboxyethyl cellulose, cellulose phosphate, cellulose sulfate, methyl cellulose, hydroxyethyl cellulose, hydroxypropyl cellulose, N,N-diethylaminoethyl cellulose, and N,N-dimethylaminoethyl cellulose.

Item 5. The porous cellulose according to any one of the Items 1 to 4, wherein the porous cellulose is in a form of a particle, a monolith, or a membrane.

Item 6. A method for producing porous cellulose, the method including:

preparing a mixed solution containing unsubstituted cellulose and a glucose unit-containing polymer excluding unsubstituted cellulose; and bringing the mixed solution into contact with a coagulation solvent, wherein a content of the polymer is not more than 30 mass % in 100 mass % of a total of the polymer and the unsubstituted cellulose.

Item 7. The method for producing porous cellulose according to Item 6, wherein, in the preparing the mixed solution, the polymer and the unsubstituted cellulose are dissolved in a solvent to prepare the mixed solution.

Item 8. The method for producing porous cellulose according to Item 7, wherein, in the preparing the mixed solution, the polymer and the unsubstituted cellulose are dissolved in the solvent simultaneously or sequentially to prepare the mixed solution.

Item 9. The method for producing porous cellulose according to Item 6, wherein, in the preparing the mixed solution, the solution of the polymer and the solution of unsubstituted cellulose are mixed to prepare the mixed solution.

Item 10. The method for producing porous cellulose according to any one of Items 6 to 9, wherein the polymer is a cellulose derivative.

Item 11. The method for producing porous cellulose according to Item 10, wherein the cellulose derivative is at least one selected from the group consisting of carboxymethyl cellulose, carboxyethyl cellulose, cellulose phosphate, cellulose sulfate, methyl cellulose, hydroxyethyl cellulose, hydroxypropyl cellulose, N,N-diethylaminoethyl cellulose, and N,N-dimethylaminoethyl cellulose.

Item 12. The method for producing porous cellulose according to any one of Items 6 to 11, wherein the bringing the mixed solution into contact with the coagulation solvent is converting the mixed solution into microdroplets in a gas and then causing the microdroplets to be absorbed by the coagulation solvent.

Advantageous Effects of Invention

According to the present disclosure, it is possible to provide novel porous cellulose having functionality that is not imparted to porous cellulose composed of unsubstituted cellulose itself.

DESCRIPTION OF EMBODIMENTS

Porous cellulose of the present disclosure is porous cellulose containing: unsubstituted cellulose; and a glucose unit-containing polymer excluding unsubstituted cellulose, wherein a content of the polymer is not more than 20 mass % in 100 mass % of a total of the polymer and the unsubstituted cellulose. The porous cellulose of the present disclosure having such a configuration is imparted with functionality (that is, the functionality of the polymer, particularly, the functionality based on functional groups of the polymer) not found in the porous cellulose composed of the unsubstituted cellulose itself.

Also, the porous cellulose of the present disclosure that exhibits such functionality is preferably produced by, for example, as described above, as a method for producing porous cellulose, adopting a method for producing porous cellulose including: preparing a mixed solution containing unsubstituted cellulose and a glucose unit-containing polymer excluding unsubstituted cellulose; and bringing the mixed solution into contact with a coagulation solvent, in which a content of the polymer is not greater than 20 mass % with respect to 100 mass % of a total of the polymer and the unsubstituted cellulose in the mixed solution.

Hereinafter, the porous cellulose and the production method of the present disclosure will be described in detail.

1. Porous Cellulose

The porous cellulose of the present disclosure includes unsubstituted cellulose (hereinafter, may simply be referred to as "unsubstituted cellulose"); and a glucose unit-containing polymer excluding unsubstituted cellulose.

In the present disclosure, unsubstituted cellulose means that a hydroxyl group contained in the cellulose is not substantially substituted (that is, it is not substituted cellulose), and a degree of substitution of the hydroxyl group is, for example, not greater than 0.05.

Also, in the present disclosure, the glucose unit-containing polymer excluding unsubstituted cellulose is a polymer having a glucose unit, but is a polymer different from the unsubstituted cellulose (hereinafter, may simply be referred to as "polymer"). In the present disclosure, since the polymer contained in the porous cellulose has a glucose unit, the polymer has high affinity with unsubstituted cellulose contained together with the polymer, and is homogeneously dispersed in the unsubstituted cellulose in the porous cellulose to form stable porous cellulose. As a result, novel porous cellulose having functionality that is not imparted to porous cellulose composed of unsubstituted cellulose alone itself is obtained.

That is, in the present disclosure, the glucose unit-containing polymer (similar to unsubstituted cellulose, a polymer formed by dehydration condensation of glucose, that is, a polymer containing glucans and their derivatives) is used together with the unsubstituted cellulose as a blend polymer. Note that there are more than one glucose dehydration condensation schemes, and the dehydration condensation type of the polymer is not particularly limited. Exemplary glucose dehydration condensation schemes are described below. In a common scheme of dehydration condensation, dehydration exclusively occur between a hydroxyl group at 1-position of glucose and a hydroxyl group other than the 1-position of glucose as a condensation counterpart. In this case, there may be two types, $\alpha$ and $\beta$, for the 1-position stereochemistry. On the other hand, as a counterpart of the condensation, there may be hydroxyl groups at the 2-position, the 3-position, the 4-position, and the 6-position, and these hydroxyl groups each have fixed stereochemistry. Therefore, there are not two epimers for each of these positions as in the 1-position. In principle, all combinations between $\alpha$ or $\beta$ in the 1-position and any one of the 2-position to the 6-position of the counterpart are conceivable, and a plurality of different binding modes may be present in the same polymer. Representative glucans include cellulose (here, in the present disclosure, unsubstituted cellulose is excluded) that has a $\beta$-1,4 bond, amylose that has an $\alpha$-1,4 bond, dextran that has an $\alpha$-1,6 bond, pullulan in which mix of an $\alpha$-1,4 bond and an $\alpha$-1,6 bond are present, curdlan that has a $\beta$-1,3 bond, schizophyllan in which glucose is bonded as a side chain, and an $\alpha$-1,3 bond. The names exemplified here are often used in a limited manner by specific microorganisms or plants that produce them, but the present disclosure is not necessarily limited to those having these names.

As the polymer, a cellulose derivative is preferable because it is similar in polarity and main chain shape to unsubstituted cellulose.

Further, examples of a substituent (functional group) contained in the cellulose derivative include a substituent bonded via an ester bond such as a sulfate group, a phosphoric acid group, or an acetic acid group; a substituent bonded via an ether bond such as a methyl group, an ethyl group, a hydroxyethyl group, a carboxymethyl group, and a carboxyethyl group.

From the viewpoint of particularly suitably exhibiting the functionality of the porous cellulose of the present disclosure, which is not imparted to the porous cellulose composed of unsubstituted cellulose alone itself, specific examples of preferable polymers include carboxymethyl cellulose, carboxyethyl cellulose, cellulose phosphate, cellulose sulfate, methyl cellulose, hydroxyethyl cellulose, hydroxypropyl cellulose, N,N-dimethylaminoethyl cellulose, N,N-diethylaminoethyl cellulose (DEAE cellulose), and the like. Since these polymers have a cellulose skeleton as with unsubstituted cellulose, it is easy to select a co-solvent with unsubstituted cellulose, and these polymers are particularly preferable because they are easily retained in porous cellulose. The polymer contained in the porous cellulose of the present disclosure may be one or two or more types.

A degree of polymerization of the polymer is not particularly limited, and examples thereof include not less than 10, and preferably not less than 100, from the viewpoint of increasing affinity with the unsubstituted cellulose in the porous cellulose and suitably exhibiting the functionality that is not imparted to the porous cellulose composed of the unsubstituted cellulose itself. Examples of an upper limit for the degree of polymerization of the polymer include not more than 1000, and preferable ranges of the degree of polymerization of the polymer include approximately from 10 to 500, and more preferably approximately from 100 to 300. As described later, the degree of polymerization of the unsubstituted cellulose is not particularly limited, and is preferably, for example, not greater than 1000. When the degree of polymerization is not greater than 1000, dispersibility and swelling properties in an alkaline aqueous solution described later are high, and thus such a degree of polymerization is preferable. When the degree of polymerization of the unsubstituted cellulose is not less than 10, the mechanical strength of the obtained porous cellulose is increased, and thus such a degree of polymerization is preferable. A preferable range of the degree of polymerization of the unsubstituted cellulose is approximately from 100 to 500.

In the porous cellulose of the present disclosure, a content of the polymer is not more than 20 mass % in the total of 100 mass % of the polymer and unsubstituted cellulose. In the present disclosure, the content of the polymer is set to 20 mass %, and thus the porous cellulose exhibits properties as a gel in water while retaining the porous structure formed by unsubstituted cellulose, and furthermore, the polymer is retained in the porous cellulose, so that the porous cellulose can exhibit the functionality that is not imparted to the porous cellulose composed of the unsubstituted cellulose itself. From the viewpoint of more preferably exhibiting these properties, an upper limit of the content of the polymer is preferably not greater than 15 mass %, more preferably not greater than 10 mass %, and even more preferably not greater than 8 mass %, and a lower limit is preferably not less than 1 mass %, more preferably not less than 2 mass %, and even more preferably not less than 3 mass %. Preferable ranges include approximately from 1 to 20 mass %, approximately from 1 to 15 mass %, approximately from 1 to 10 mass %, approximately from 1 to 8 mass %, approximately from 2 to 20 mass %, approximately from 2 to 15 mass %, approximately from 2 to 10 mass %, approximately from 2 to 8 mass %, approximately from 3 to 20 mass %, approximately from 3 to 15 mass %, approximately from 3 to 10 mass %, and approximately from 3 to 8 mass %.

The porous cellulose of the present disclosure is preferably obtained in a state of being dispersed or immersed in water as described later. The porous cellulose of the present disclosure is in a hydrated state in water, and forms a hydrated gel. In addition, the porous cellulose of the present disclosure can be usually stored in a wet state. In the porous cellulose of the present disclosure, a solid content of the porous cellulose in a hydrated state measured by the following method is preferably not more than 10 mass %. Furthermore, the solid content is, for example, not less than 1 mass %, preferably not less than 3 mass %, and the preferable range includes from 1 to 10 mass % and from 3 to 10 mass %.

(Measurement of Solid Content)

The porous cellulose in a state of being settled in pure water is allowed to stand under atmospheric pressure in an environment at a temperature of 25° C. for one day or more (normally, within 3 days). Next, approximately 2 mL of the porous cellulose in the pure water is drawn with a pipette, the drawn fraction is dispersed in 20 ml of a solution of a neutral detergent (for example, Mama Lemon, available from Lion Corporation) diluted 1000 times with pure water, and the solution is allowed to stand for one day or more (normally, within 3 days) to precipitate the porous cellulose. Thereafter, a supernatant is removed by decanting, and ⅓ of remaining slurry, which serves as one measurement sample, is placed onto filter paper (for example, No. 131 available from ADVANTEC, 150 mm) corresponding to No. 3 type specified in JIS P 3801 [Filter paper (for chemical analysis)], and left to stand for 20 seconds to remove excessive moisture. Then, a lump of the porous cellulose remaining on the filter paper is separated from the filter paper and weighed, and this weight is defined as a wet mass of the porous cellulose (when the porous cellulose is in the form of a lump, the lump of approximately from 200 to 300 mg is cut out, and is rolled over on the filter paper so that the filter paper absorbs the excess water present on the surface of the lump, and the lump is then weighed, dried, and weighed). The porous cellulose is then dried in an oven at 80° C. for 2 hours to obtain dry mass. These operations are performed on three measurement samples, a respective proportion of dry mass to the wet mass is calculated, and the average value of three values obtained is defined as a solid content.

In the case where the porous cellulose of the present disclosure is stored in a wet state for a long period of time, a preservative such as an alcohol or sodium azide is added to prevent spoilage. In addition, the porous cellulose to which glycerin, a saccharide, urea, or the like has been added can also be dried, preferably freeze-dried.

The porous cellulose of the present disclosure is not particularly limited in its form, and examples include the porous cellulose in a form of a particle (spherical particle, amorphous particle), a lump (monolith), a membrane, and the like. For example, when the porous cellulose of the present disclosure is in the form of a particle, the particle size of the porous cellulose particles can be selected as appropriate in accordance with the application, and the lower limit thereof is, for example, not less than 1 μm, not less than 5 μm, not less than 10 μm, not less than 20 μm, and not less than 50 μm, and the upper limit thereof is, for example, not greater than 3 mm, not greater than 600 μm, not greater than 500 μm, not greater than 400 μm, and not greater than 300 μm, and preferable ranges thereof include approximately from 1 to 600 μm, approximately from 1 to 500 μm, approximately from 1 to 400 μm, approximately from 1 to 300 μm, approximately from 5 to 600 μm, approximately from 5 to 500 μm, approximately from 5 to 400 μm, approximately from 5 to 300 μm, approximately from 10 to 600 μm, approximately from 10 to 500 μm, approximately from 10 to 400 μm, approximately from 10 to 300 μm, approximately from 20 to 600 μm, approximately from 20 to 500 μm, approximately from 20 to 400 μm, approximately from 20 to 300 μm, approximately from 50 to 600 μm, approximately from 50 to 500 μm, approximately from 50 to 400 μm, and approximately from 50 to 300 μm. These particle sizes are particularly preferable when the porous cellulose of the present disclosure is used as a filler or a carrier for chromatography. When the porous cellulose particles of the present disclosure are actually used, classification is further performed according to the purpose, and the porous cellulose particles having a more preferable particle size range are used. Also, for example, if the porous cellulose of the present disclosure is the form of a monolith, the size of the porous cellulose monolith may be appropriately selected according to the application (for example, to match the size of the column when used as a carrier for chromatography). In addition, for example, when the porous cellulose of the present disclosure is in the form of a membrane, the thickness of the porous cellulose membrane may be appropriately selected according to the application (for example, a hollow fiber membrane or the like), and is, for example, approximately from 100 μm to 5 mm.

In addition, the porous cellulose of the present disclosure can be preferably used for, for example, size exclusion chromatography since it exhibits the functionality that is not imparted to the porous cellulose composed of the unsubstituted cellulose itself. Furthermore, this again indicates that chromatographic separation by various modes besides size exclusion can also be used. These other modes include modes such as ion exchange chromatography, hydrophobic interaction chromatography, and affinity chromatography.

In addition, in the porous cellulose of the present disclosure, cellulose chains may be crosslinked by covalent bonding using a crosslinking agent and this can be used as a separating agent having improved strength.

An affinity ligand can be immobilized on the porous cellulose of the present disclosure or crosslinked porous cellulose medium, and thus adsorbent can also be produced. The adsorbent can also be used as a separating agent for affinity chromatography.

In the present disclosure, the method for producing porous cellulose is not particularly limited as long as the porous cellulose of the present disclosure that has the above configuration is obtained, and the porous cellulose can be suitably produced by the production method described in the following section "2. Method for producing porous cellulose".

2. Method for Producing Porous Cellulose

The method for producing porous cellulose of the present disclosure includes: preparing a mixed solution containing unsubstituted cellulose and a glucose unit-containing polymer excluding unsubstituted cellulose (preparing mixed solution); and bringing the mixed solution into contact with a coagulation solvent (coagulating fine particles). In addition, in the mixed solution, the content of the polymer is not more than 30 mass % in the total of 100 mass % of the polymer and unsubstituted cellulose. Details of the polymer, the unsubstituted cellulose, and the like are as described above in the section of "1. Porous cellulose". The reason for setting the upper limit of the polymer content in the mixed solution to not greater than 30 mass % and setting the content higher than the above-mentioned upper limit of the polymer content in the porous cellulose of not more than 20 mass % is that the polymer may be slightly leached out during formation of a gel in the coagulating fine particles. It is also possible to produce porous cellulose having the polymer content of greater than 20 mass % and not greater than 30 mass % by using the method for producing porous cellulose of the present disclosure.

(Preparing Mixed Solution)

The preparing a mixed solution is preparing a mixed solution containing unsubstituted cellulose and a glucose unit-containing polymer excluding unsubstituted cellulose. In the preparing a mixed solution, the preparation method is not particularly limited as long as a mixed solution containing a polymer and unsubstituted cellulose at a predetermined content is prepared. For example, in the preparing the mixed solution, the polymer and the unsubstituted cellulose are dissolved in a solvent to prepare a mixed solution. More specifically, examples include a method for preparing a mixed solution by simultaneously or sequentially dissolving a polymer and unsubstituted cellulose in a solvent in the preparing a mixed solution, and a method for preparing a mixed solution by mixing a solution of a polymer (hereinafter, may be referred to as a "polymer solution") and a solution of unsubstituted cellulose (hereinafter, may be referred to as an "unsubstituted cellulose solution").

In the case of adopting a method for preparing a mixed solution by simultaneously or sequentially dissolving a polymer and unsubstituted cellulose in a solvent, a solvent capable of dissolving both the polymer and the unsubstituted cellulose is selected to prepare a mixed solution.

On the other hand, in a method for preparing a mixed solution by mixing a polymer solution and an unsubstituted cellulose solution, a polymer solution is prepared using a solvent capable of dissolving a polymer, an unsubstituted cellulose solution is further prepared using a solvent capable of dissolving the unsubstituted cellulose, and these solutions are mixed to prepare a mixed solution. The solvent capable of dissolving the polymer and the solvent capable of dissolving the unsubstituted cellulose may be the same as or different from each other; however, it is not preferable that precipitation or the like occurs when the polymer solution and the unsubstituted cellulose solution are mixed, and thus the same solvent is preferably used as the solvent of these solutions. Even when the same solvent is used, the two solutions may not be easily mixed when the solutes are different from each other. However, in a case where the mixing ratio of the two solutions is uneven and biased to one solution, even when partial phase separation occurs immediately after mixing, it is often observed that the two solutions form one phase in the end in many cases.

In each of the unsubstituted cellulose solution, the polymer solution, and the mixed solution, examples of the solvent include a copper ethylenediamine solution, N-methylmorpholine oxide (NMMO) monohydrate, an alkali hydroxide aqueous solution, a caustic alkali-urea-based aqueous solution, a calcium thiocyanate aqueous solution, an N,N'-dimethylacetamide solution of lithium chloride or lithium bromide, a dimethylformamide solution of lithium chloride, a dimethylimidazolium solution of lithium chloride, a dimethylsulfoxide solution of lithium chloride, and an ionic solvent mainly composed of an alkylimidazolium salt. These solvents may be used alone or in combination of two or more thereof. The solvent is preferably an aqueous liquid (liquid containing water as a main component), and among these, an alkali hydroxide aqueous solution and an alkali-urea-based hydroxide aqueous solution (for example, urea-alkali hydroxide aqueous solution, including urea, thiourea, and the like) are particularly preferable.

A specific example of the aqueous liquid as a solvent is from 7 to 10 mass % of aqueous solution of alkali hydroxide (alkali hydroxide aqueous solution), and preferably an aqueous solution further containing from 5 to 15 mass % of urea or thiourea (urea-alkali hydroxide aqueous solution). As the alkali hydroxide, lithium hydroxide and sodium hydroxide are preferable in terms of good solubility of unsubstituted cellulose and a polymer, and sodium hydroxide is preferable from the viewpoint of raw material cost. In a solvent based on this alkali hydroxide aqueous solution, the solute (unsubstituted cellulose, polymer) and the solvent are preferably cooled to from $-10°$ C. to $-15°$ C. while stirring, and then the solution is brought back to ambient temperature; and this operation is carried out once or more than once to make a fluid solution. Further, when an insoluble matter remains and adversely affects a function of a final product, the insoluble matter can be removed by filtration or centrifugation. Furthermore, it is also possible to dissolve in a 40 to 60 mass % of aqueous solution of lithium bromide heated to $100°$ C. or higher. When the organic solvent is primarily used, for example, N,N'-dimethylacetamide containing from 8 to 12 mass % of lithium chloride or lithium bromide as described above is preferable. However, the sodium hydroxide aqueous solution or the urea-alkali hydroxide aqueous solution described above is a more preferable solvent which is inexpensive and has a low environmental load in that no harmful substances remain as long as it is appropriately neutralized.

The unsubstituted cellulose solution refers to a liquid containing unsubstituted cellulose, which exhibits fluidity and is solidified in a state where the unsubstituted cellulose and the polymer are miscible with each other when a mixed solution with a polymer solution is brought into contact with a coagulation solvent. It does not matter whether unsubstituted cellulose molecules may be dispersed in the unsubstituted cellulose solution, some aggregates may remain, or fine fibrous matters may be merely dispersed (sometimes referred to as a dispersion). That is, in the method for producing a porous cellulose according to the present disclosure, the unsubstituted cellulose solution means a liquid containing unsubstituted cellulose, and the term encompasses a dispersion in which unsubstituted cellulose is dispersed in a liquid, and a solution in which unsubstituted cellulose is dissolved in a liquid. In the method for producing porous cellulose of the present disclosure, when an unsubstituted cellulose solution is prepared, it is sufficient that the unsubstituted cellulose solution contains the unsubstituted cellulose, and the form may be either dispersion/dissolution or a mixed state thereof.

The same applies to the polymer solution, and the polymer solution refers to a liquid containing a polymer, which exhibits the fluidity and is solidified in a state where the unsubstituted cellulose and the polymer are miscible with each other when a mixed solution with an unsubstituted cellulose solution is brought into contact with a coagulation solvent. It does not matter whether polymer molecules may be dispersed in the polymer solution, some aggregates may remain, or fine fibrous matters may be merely dispersed (sometimes referred to as a dispersion). That is, in the method for producing porous cellulose according to the present disclosure, the polymer solution means a liquid containing a polymer, and the term encompasses a dispersion in which a polymer is dispersed in a liquid, and a solution in which a polymer is dissolved in a liquid. In the method for producing porous cellulose of the present disclosure, when a polymer solution is prepared, it is sufficient that the polymer solution contains a polymer, and the form may be either dispersion/dissolution or a mixed state thereof.

The same applies to the mixed solution, and the mixed solution refers to a liquid containing unsubstituted cellulose and a polymer, which exhibits the fluidity and is solidified in a state where the unsubstituted cellulose and the polymer are miscible with each other when a mixed solution is brought into contact with a coagulation solvent, and it does not matter whether unsubstituted cellulose molecules and polymer molecules may be dispersed in the mixed solution, some aggregates may remain, or fine fibrous matters may be merely dispersed (sometimes referred to as a dispersion). That is, in the method for producing a porous cellulose according to the present disclosure, the mixed solution means a liquid containing unsubstituted cellulose and a polymer, and the term encompasses a dispersion in which unsubstituted cellulose or a polymer is dispersed in a liquid, and a solution in which unsubstituted cellulose or a polymer is dissolved in a liquid. In the method for producing porous cellulose according to the present disclosure, in terms of the form of the unsubstituted cellulose and the polymer in the mixed solution, each may be dispersed or dissolved, or in a mixed state of the dispersed and dissolved.

The method for preparing the cellulose solution will be described in detail below using an exemplary case in which the solvent is a urea-alkali hydroxide aqueous solution. As for the polymer solution, a polymer solution can be similarly prepared using a polymer as a solute. In addition, also in a method for preparing a mixed solution by simultaneously or sequentially dissolving a polymer and unsubstituted cellulose in a solvent, a mixed solution can be similarly prepared using the unsubstituted cellulose and the polymer as solutes.

The alkali contained in the alkali hydroxide aqueous solution is preferably lithium hydroxide, sodium hydroxide, potassium hydroxide, or quaternary ammonium hydroxide, and sodium hydroxide is most preferable from the perspectives of product safety, price, and good dissolution or dispersibility.

The alkali concentration of the alkaline aqueous solution is not particularly limited, but is preferably from 3 to 20 mass %. When the concentration of the alkali is within this range, dispersibility, swelling property, and solubility of the unsubstituted cellulose in the alkaline aqueous solution are high, and thus such a concentration is preferable. The concentration of alkali is more preferably from 5 to 15 mass %, more preferably from 6 to 10 mass %.

Urea or thiourea is further added to the alkaline aqueous solution. The concentration of urea or thiourea is preferably from 10 to 15 mass %. Three components (cellulose, alkali hydroxide, and urea or thiourea) are added to the water, and the order of addition is appropriately selected to optimize the dissolution state of the cellulose. Cooling the slurry thus obtained under the conditions described later produces a more transparent unsubstituted cellulose solution than the solution immediately after addition of all the components.

As described above, when the degree of polymerization of the unsubstituted cellulose is not greater than 1000, dispersibility and swelling properties in an alkaline aqueous solution are high, and thus such a degree of polymerization is preferable. Another example of the unsubstituted cellulose with improved solubility is a dissolved pulp.

A condition for mixing the alkaline aqueous solution and the unsubstituted cellulose is not particularly limited as long as an unsubstituted cellulose solution is prepared. For example, the unsubstituted cellulose may be added to an alkaline aqueous solution, or an alkaline aqueous solution may be added to the unsubstituted cellulose. Also in the case of preparing a polymer solution, a mixing condition of the alkaline aqueous solution and the polymer is not particularly limited as long as a polymer solution can be prepared, and the polymer may be added to the alkaline aqueous solution, or the alkaline aqueous solution may be added to the polymer. In addition, also in a method for preparing a mixed solution by simultaneously or sequentially dissolving a polymer and unsubstituted cellulose in a solvent, a mixing order of the polymer, the unsubstituted cellulose, and the solvent is not particularly limited.

The unsubstituted cellulose may be suspended in water prior to mixing with the alkaline aqueous solution.

In addition, a concentration of the unsubstituted cellulose in the unsubstituted cellulose solution is not particularly limited as long as the solution has the fluidity required in the subsequent process and is appropriately set such that the solid content of the porous cellulose prepared from the mixed solution described later is not greater than 10%. Examples of the concentration of the unsubstituted cellulose in the unsubstituted cellulose solution include approximately from 2 to 10 mass %. A concentration of the polymer in the polymer solution is not particularly limited as long as the solid content and the polymer content of the porous cellulose prepared from the mixed solution described later are appropriately set, and is, for example, approximately from 2 to 10 mass %.

A temperature at which the unsubstituted cellulose solution is prepared is not particularly limited, but for example, an unsubstituted cellulose solution is suitably formed by mixing the unsubstituted cellulose with an alkaline aqueous solution containing urea or thiourea at room temperature, cooling to a low temperature while stirring, and then bringing back the mixture to a manageable temperature. Examples of the low temperature when cooling include from approximately 0° C. to −20° C., and preferably from approximately −5° C. to −15° C. The same applies to the temperature at the time of preparing the polymer solution.

A mixed solution is prepared by mixing the unsubstituted cellulose solution and the polymer solution. A mixing ratio of the unsubstituted cellulose solution and the polymer solution is appropriately adjusted such that the polymer content of the porous cellulose prepared from the mixed solution results in an appropriate value. When the unsubstituted cellulose solution and the polymer solution are mixed, the unsubstituted cellulose solution and the polymer solution are preferably sufficiently stirred to be mixed into a mixed solution of one phase. As described above, the polymer and the unsubstituted cellulose can be simultaneously or sequentially dissolved in the solvent to prepare a mixed solution.

In the mixed solution, the content of the polymer is not more than 30 mass % in the total of 100 mass % of the polymer and unsubstituted cellulose. In the mixed solution, the content of the polymer is set to 20 mass %, and thus the porous cellulose exhibits properties as a gel in water while retaining the porosity formed by unsubstituted cellulose, and furthermore, the polymer is retained in the porous cellulose, so that the porous cellulose can exhibit the functionality that is not imparted to the porous cellulose composed of the unsubstituted cellulose itself. From the viewpoint of more preferably exhibiting these properties, the content of the polymer in the mixed solution is preferably not greater than 15 mass %, more preferably not greater than 10 mass %, and even more preferably not greater than 8 mass %, and the lower limit of the content is preferably not less than 1 mass %, more preferably not less than 2 mass %, and even more preferably not less than 3 mass %. Preferable ranges include approximately from 1 to 20 mass %, approximately from 1 to 15 mass %, approximately from 1 to 10 mass %, approximately from 1 to 8 mass %, approximately from 2 to 20 mass %, approximately from 2 to 15 mass %, approximately from 2 to 10 mass %, approximately from 2 to 8 mass %, approximately from 3 to 20 mass %, approximately from 3 to 15 mass %, approximately from 3 to 10 mass %, and approximately from 3 to 8 mass %.

In addition, the total concentration of the polymer and the unsubstituted cellulose in the mixed solution is preferably from 1 to 10 mass %. When the concentration is not less than 1 mass %, the mechanical strength of the obtained porous cellulose is increased, which is preferable. When the content is not more than 10 mass %, a viscosity of the mixed solution is low, and such a viscosity can facilitate spraying the solution from a spray nozzle such that the porous cellulose has, for example, a predetermined particle size as described above. The total concentration in the mixed solution is more preferably from 2 to 6 mass %, and even more preferably from 3 to 5 mass %. Note that the total concentration in the mixed solution does not include the component that fails to completely dissolve, disperse, or be swollen and to be uniform in the solution.

(Coagulating Fine Particles)

In the method for producing porous cellulose of the present disclosure, after the preparing a mixed solution, coagulating is performed, in which the mixed solution is brought into contact with a coagulation solvent. By bringing the mixed solution into contact with the coagulation solvent, the unsubstituted cellulose solution and the polymer in the mixed solution are coagulated in a miscible state to form porous cellulose.

A specific aspect of the contact with the coagulation solvent described herein can be performed with a known method, depending on the form of the intended porous cellulose (for example, a particle (spherical particle, amorphous particle), a lump (monolith), and a membrane). One of important forms in terms of applications of porous cellulose is a spherical particle. In the coagulating fine particles, typical methods for forming a spherical particle of the porous cellulose include a method in which a mixed solution is stirred and dispersed together with an optional appropriate dispersant in a liquid, the liquid having a relatively high viscosity and not miscible in the mixed solution (for example, liquid paraffin, fluorolube, or the like), and the obtained dispersion and a coagulation solvent (solvent that precipitates unsubstituted cellulose and a polymer by being mixed with the dispersion) are added while stirring.

In addition, other possible methods include a method in which the mixed solution can be formed into droplets in a gas using a spray, a nozzle, or the like, and the droplets are added into the coagulation solvent. That is, in this method of preparing the porous cellulose particles, the coagulating fine particles includes converting the mixed solution into microdroplets in a gas, and then causing the microdroplets to be absorbed by the coagulation solvent. Alternatively, the mixed solution can be extruded into a strand, placed in a coagulation solvent, solidified, and then cut or broken into amorphous particles.

On the other hand, when preparing the porous cellulose monolith in the coagulating fine particles, the mixed solution is placed in a suitable container and immersed in a coagulation solvent. If possible, the vapor of the coagulation solvent can also be absorbed through the gas phase before immersion.

In addition, the most common method for obtaining a membrane-like porous cellulose includes a method including casting a mixed solution on an appropriate flat plate (forming a liquid phase having a constant thickness using a spin coater or a bar coater), and immersing this in a coagulation solvent. In order to enhance the permeability of the porous cellulose membrane, the method can further include an operation such as causing the porous cellulose membrane to absorb the coagulation solvent from the gas phase prior to immersion. When the form of the porous cellulose membrane is a hollow fiber, the method includes causing a coagulation solvent to run through inside a double tube, causing the cellulose solution to run over outside the double tube, and causing the outer portion to pass through the gas phase as necessary, and then guiding the outside into the coagulation solvent (this coagulation solvent is not necessary to be the same as the one that runs through the inner tube).

The coagulation solvent is not particularly limited as long as it precipitates unsubstituted cellulose and a polymer from the mixed solution, and examples thereof include an organic solvent such as methanol, ethanol, and acetone, water, water in which salts such as salt are dissolved, and water containing an acid when the mixed solution contains alkali hydroxide.

In the case of long-term storage in a wet state, a preservative such as an alcohol or sodium azide is added to prevent spoilage. In addition, the porous cellulose to which glycerin, a saccharide, urea, or the like has been added can also be dried, preferably freeze-dried.

EXAMPLES

The present disclosure will be described below in detail by presenting examples and comparative examples. Note that each of the configurations, combinations thereof, and the like in each example are merely an example, and various additions, omissions, substitutions, and other changes may be made as appropriate without departing from the spirit of the present disclosure. The present disclosure is not limited by the examples and is limited only by the claims.

First Example (Preparation of Unsubstituted Cellulose Solution)

In a flask, 70.35 g of sodium hydroxide was dissolved in 808.05 g of water, the solution was cooled to room temperature, and 42.11 g of powdered cellulose (Ceolus PH 101, unsubstituted cellulose solution, available from ASAHI KASEI CORPORATION) was dispersed in the solution while stirring. Furthermore, after 120.05 g of urea was added and dissolved, the mixture was cooled to −15° C. while stirring for approximately 1 hour, and then heated to room temperature using a water bath, resulting in a generally transparent solution. Note that, since the water content of the powdered cellulose was 4.25 mass %, a solvent system was 1000.24 g in total, the unsubstituted cellulose was 40.32 g, the unsubstituted cellulose concentration external was 4.0 mass %, and the unsubstituted cellulose concentration internal was 3.85 mass %.

(Preparation of CMC Solution)

Similarly, 3.57 g of sodium hydroxide was dissolved in 41.5 g of water, and the solution was brought back to room temperature. Then, 0.52 g of carboxymethyl cellulose (CMC) (CMC 1190 (Daicel Corporation)) was added to the solution, and the solution became a slightly turbid, but clear, and viscous solution. When 5.97 g of urea was dissolved therein, a highly transparent solution was obtained.

(Preparation of Mixed Solution)

69.90 g of the CMC solution was added to 336.1 g of the unsubstituted cellulose solution and stirred to form a uniformly mixed and transparent mixed solution.

(Atomization)

The resulting mixed solution was sprayed into a mist and absorbed in methanol to obtain a fine powder. This was repeatedly washed with water to obtain porous cellulose in pure water, as porous fine particles in which cellulose and CMC were mixed.

(Measurement of CMC content)

The porous cellulose obtained in Example 1 and the CMC for reference were washed with 1 N hydrochloric acid, and after the group-$CO_2Na$ was converted to the group-$CO_2H$, the mixture was dried. For the porous cellulose, the porous cellulose itself, and for the CMC reference, the CMC together with unsubstituted cellulose at an amount of 19 times the CMC were each ground with potassium bromide. Each specimen was compressed to form a disk, and was measured for an infrared absorption spectrum in the absorbance mode. As an index of the carboxyl group content, the relative intensity at 1735 $cm^{-1}$ (vC=O region based on carboxyl group) with respect to 2890 $cm^{-1}$ (vC—H region based on cellulose skeleton) was determined. Note that, in order to eliminate the effect of the nearby peak, the tangential line was given between the vicinities of 3000 $cm^{-1}$ and 2600 $cm^{-1}$ for the 2890 $cm^{-1}$ peak, and another tangential line was given between the vicinities of 1800 $cm^{-1}$ and 1570 $cm^{-1}$ for the 1735 $cm^{-1}$ peak, respectively, and these were assumed to be baseline. When the absorbance difference from baseline to peak top was designated as intensity I, $I_{1735}/I_{2890}$ was 0.204 for porous cellulose, and 0.17 for reference. Since the acid type CMC content (acid type CMC weight % in the unsubstituted cellulose and the acid type CMC mixture) of the standard sample was 4.45%, the acid type CMC content of the porous cellulose was determined to be 5.3 mass % (4.45×0.204/0.17=0.053). On the other hand, the CMC content of the solution used to prepare the porous cellulose was determined to be 4.7 mass % by converting the CMC (normal degree of substitution 1.5, about half of which is the Na salt) weight into the acid type CMC weight. In consideration of the measurement accuracy, it can be concluded that almost all the added CMC remains in the porous cellulose.

(Measurement of Solid Content)

The solid content of the porous cellulose particles in a hydrated state obtained in Example 1 was measured by the following method, and the solid content was 4.3 mass %. The porous cellulose particles that had settled in pure water was allowed to stand under atmospheric pressure in an environment at a temperature of 25° C. for one day. Next, approximately 2 mL of the porous cellulose particles in the pure water was drawn with a pipette, the drawn fraction was dispersed in 20 ml of a solution of a neutral detergent (for example, Mama Lemon, available from Lion Corporation) diluted 1000 times with pure water, and the solution was allowed to stand for one day to precipitate the particles. Thereafter, a supernatant was removed by decanting, and approximately ⅓ of remaining slurry, which served as one measurement sample, was placed onto filter paper (No. 131, 150 mm, ADVANTEC) corresponding to No. 3 type specified in JIS P 3801 [Filter paper (for chemical analysis)], the slurry was left to stand for 20 seconds to remove excessive moisture, a lump of the porous cellulose remaining on the filter paper was separated from the filter paper, and the lump was weighed, and this weight was defined as a wet mass of the porous cellulose particles. The porous cellulose particles were then dried in an oven at 80° C. for 2 hours to obtain dry mass. These operations were performed on three measurement samples, the respective proportion of dry mass to the wet mass was calculated, and the average value of three values obtained was defined as a solid content.

Test Example 1 (Adsorption by Porous Cellulose)

The porous cellulose obtained in Example 1 was classified with a sieve to obtain a portion with the size from 53 μm to 106 μm. Approximately 1 mL of the precipitate that had settled in water was placed in a plastic syringe (5 mL) with a filter placed on the bottom, and some water was added and stirred. Water was freely dripped from the syringe bottom and a bed having a depth of 1.4 cm was prepared. 4 mL of an approximately 0.2% aqueous solution of potassium carbonate was passed through this bed, and then washed two times with 3 mL of pure water. When 2.0 mL of a 3.5 mg/100 mL water solution of methylene blue was passed through the bed, the bed was colored in deep blue to a depth of 1 to 2 mm from the upper surface. This result indicates that the anionic porous cellulose adsorbs a large amount of cationic methylene blue by ion exchange action.

On the other hand, when the same adsorption of methylene blue was tested for the porous cellulose microparticles prepared similarly without adding CMC, the bed was colored to a depth of 1 cm from the upper surface, and it clearly indicated that the methylene blue was not adsorbed by the bed.

Second Example (Preparation of Cellulose Phosphate Solution)
1.00 g of cellulose phosphate (P 11 Phosphorylated Cellulose) available from Whatman Coulter, Inc. was suspended in 14.81 g of water, and to this solution, a liquid prepared by dissolving 1.75 g of sodium hydroxide in 5.59 g of water was added. The mixture was sufficiently stirred. Then, 3.0 g of urea was further added to the mixture, and the mixture was stirred to increase the transparency and viscosity. Thus, a liquid in which swollen insoluble particles were suspended was obtained. This was cooled in a dry ice bath until white crystals were partially precipitated, and an operation of stirring the mixture while bringing back the mixture to room temperature was repeated twice. The liquid was centrifuged at 10000 rpm at 4° C. for 15 minutes and a transparent and viscous supernatant solution was obtained by decantation.
(Preparation of Mixed Solution)
When 90 g of an unsubstituted cellulose solution prepared in the same manner as in Examples 1 and 10 g of the cellulose phosphate solution were mixed and stirred, the mixture was uniformly mixed to obtain a transparent mixed solution.
(Atomization)
The resulting mixed solution was sprayed to a mist form and absorbed in methanol to obtain a fine powder in a suspended state. Acetic acid was added to neutralize a methanol liquid, the fine powder was separated by filtration. The fine powder was repeatedly washed with water and porous cellulose was obtained as porous fine particles in which unsubstituted cellulose and cellulose phosphate were mixed in pure water.
(Phosphorus Analysis)
The resulting particles were dried and subjected to ICP emission spectrometry, and the phosphorus content was 4300 ppm. Based on this value, a weight ratio of P11 (cellulose phosphate) in a mixed dry matter of cellulose and P11 was estimated to be 4.6%. Hereinafter, this calculation will be described. According to "CERTIFICATE OF ANALYSIS" from Whatman Coulter, Inc., P11 contained 3.9% of water, and its dried matter contained 28.9% of the phosphoric acid. When this is converted into the phosphorus atom content, the phosphorus atom content is multiplied by 31/98 (phosphorus atom weight/phosphoric acid molecular weight) to give 9.14%. The value of phosphorus content 4200 ppm determined by the analysis of the dry particles is divided by 0.0914 to give 0.046, that is, 4.6%, and this is the value of the converted content of dry P11.
(Measurement of Solid Content)
The solid content of the porous cellulose particles in a hydrated state obtained in Example 2 was measured in the same method as in Example 1, and the solid content was 4.2 mass %.

The invention claimed is:
1. Porous cellulose comprising:
   unsubstituted cellulose; and a glucose unit-containing polymer excluding unsubstituted cellulose,
   wherein a content of the glucose unit-containing polymer is not more than 20 mass % in 100 mass % of a total of the glucose unit-containing polymer and the unsubstituted cellulose, and
   a degree of polymerization of the unsubstituted cellulose is not less than 10 and pot greater than 1000.
2. The porous cellulose according to claim 1, wherein a solid content of the porous cellulose in a hydrated state is not more than 10 mass %, the solid content being measured by a solid content measurement method
   and the method includes performing operation of:
   allowing the porous cellulose that has settled in pure water to stand under atmospheric pressure in an environment at a temperature of 25° C. for one day or more; then, drawing approximately 2 mL of the porous cellulose in the pure water with a pipette, dispersing the drawn fraction in 20 ml of a solution of neutral detergent diluted 1000 times with pure water, and allowing the solution to stand for one day or more to precipitate the porous cellulose; then, removing a supernatant by decanting, placing approximately ⅓ of remaining slurry, which serves as one measurement sample, onto filter paper corresponding to No. 3 type specified in JIS P 3801 [Filter paper (for chemical analysis)], leaving the slurry to stand for 20 seconds to remove excessive moisture, separating a lump of the porous cellulose remaining on the filter paper from the filter paper, and weighing the lump, the weight being defined as a wet mass of the porous cellulose; and then, drying the porous cellulose in an oven at 80° C. for 2 hours, and weighing the porous cellulose, the weight being defined as a dry mass, and performing the operation on three measurement samples, calculating a respective proportion of dry mass to the wet mass, and determining an average value of three values, the average value being defined as a solid content.
3. The porous cellulose according to claim 1, wherein the glucose unit-containing polymer is a cellulose derivative.

4. The porous cellulose according to claim 3, wherein the cellulose derivative is at least one selected from the group consisting of carboxymethyl cellulose, carboxyethyl cellulose, cellulose phosphate, cellulose sulfate, methyl cellulose, hydroxyethyl cellulose, hydroxypropyl cellulose, N,N-diethylaminoethyl cellulose, and N,N-dimethylaminoethyl cellulose.

5. The porous cellulose according to claim 1, wherein the porous cellulose is in a form of a particle, a monolith, or a membrane.

6. The porous cellulose according to claim 1, wherein the degree of polymerization of the unsubstituted cellulose is from 100 to 500.

7. The porous cellulose according to claim 1, wherein a degree of polymerization of the glucose unit-containing polymer is not less than 10 and not more than 1000.

* * * * *